US010415751B2

(12) United States Patent
Geiken et al.

(10) Patent No.: US 10,415,751 B2
(45) Date of Patent: Sep. 17, 2019

(54) WIND TURBINE AND METHOD FOR CONTROLLING AN ACCESS POINT IN A CLOSED AREA OF A WIND TURBINE

(71) Applicant: WOBBEN PROPERTIES GMBH, Aurich (DE)

(72) Inventors: Peter Geiken, Emden (DE); Jörg Rohlfsen, Friedeburg (DE); Reiner Schmees, Lathen (DE)

(73) Assignee: Wobben Properties GmbH, Aurich (DE)

( * ) Notice: Subject to any disclaimer, the term of this patent is extended or adjusted under 35 U.S.C. 154(b) by 148 days.

(21) Appl. No.: 15/510,659

(22) PCT Filed: Sep. 16, 2015

(86) PCT No.: PCT/EP2015/071158
§ 371 (c)(1),
(2) Date: Mar. 10, 2017

(87) PCT Pub. No.: WO2016/042006
PCT Pub. Date: Mar. 24, 2016

(65) Prior Publication Data
US 2018/0224063 A1 Aug. 9, 2018

(30) Foreign Application Priority Data
Sep. 18, 2014 (DE) .......................... 10 2014 218 804

(51) Int. Cl.
*F16P 3/08* (2006.01)
*F03D 80/00* (2016.01)
(Continued)

(52) U.S. Cl.
CPC ................ *F16P 3/08* (2013.01); *F03D 80/00* (2016.05); *F03D 80/50* (2016.05); *F03D 80/80* (2016.05);
(Continued)

(58) Field of Classification Search
None
See application file for complete search history.

(56) References Cited

U.S. PATENT DOCUMENTS 8,272,850 B2   9/2012   Stenberg
8,944,766 B2   2/2015   Nielsen et al.
(Continued)

FOREIGN PATENT DOCUMENTS

CN   201874747 U   6/2011
CN   102146893 A   8/2011
(Continued)

*Primary Examiner* — Timothy Hannon
(74) *Attorney, Agent, or Firm* — Seed Intellectual Property Law Group LLP

(57) ABSTRACT

A wind turbine having a nacelle with a stationary region and a rotor, at least one blocking unit for blocking the rotor, and an access control system is provided. The access control system controls a locking of at least one access door to at least one closed-off region in the wind turbine depending on a blocking of the rotor by means of the least one blocking unit. The access control system has a key transfer system and a hydraulic control unit for controlling the blocking unit. The key transfer system has a hydraulic key unit for preventing an unintentional activation of the hydraulic unit and an access door key unit for locking or unlocking the access door. The key transfer system has at least one first and second key, the hydraulic control unit being locked or unlocked by means of the first key, and the access door key unit being locked or unlocked by means of the second key, and the key transfer system also having a fan key unit for activating or deactivating a fan, the first key of the hydraulic key unit being used to lock and unlock the fan key unit and a fan key being used as a second key for locking or unlocking the access door key unit.

5 Claims, 20 Drawing Sheets

(51) Int. Cl.
*F03D 80/80* (2016.01)
*F03D 80/50* (2016.01)
*H01H 27/06* (2006.01)

(52) U.S. Cl.
CPC ......... *H01H 27/06* (2013.01); *F05B 2260/30* (2013.01); *F05B 2260/64* (2013.01); *F05B 2270/604* (2013.01); *Y02E 10/726* (2013.01)

(56) References Cited

U.S. PATENT DOCUMENTS 9,157,577 B2 10/2015 Geiken
2003/0140669 A1 7/2003 Bailey et al.

FOREIGN PATENT DOCUMENTS

| DE | 102006006949 A1 | 8/2007 |
| DE | 102010043436 A1 | 5/2012 |
| EP | 1985334 A2 | 10/2008 |
| EP | 1984932 B1 | 3/2010 |
| EP | 2740928 A1 | 6/2014 |
| WO | 2007093268 A1 | 8/2007 |
| WO | 2010102967 A2 | 9/2010 |

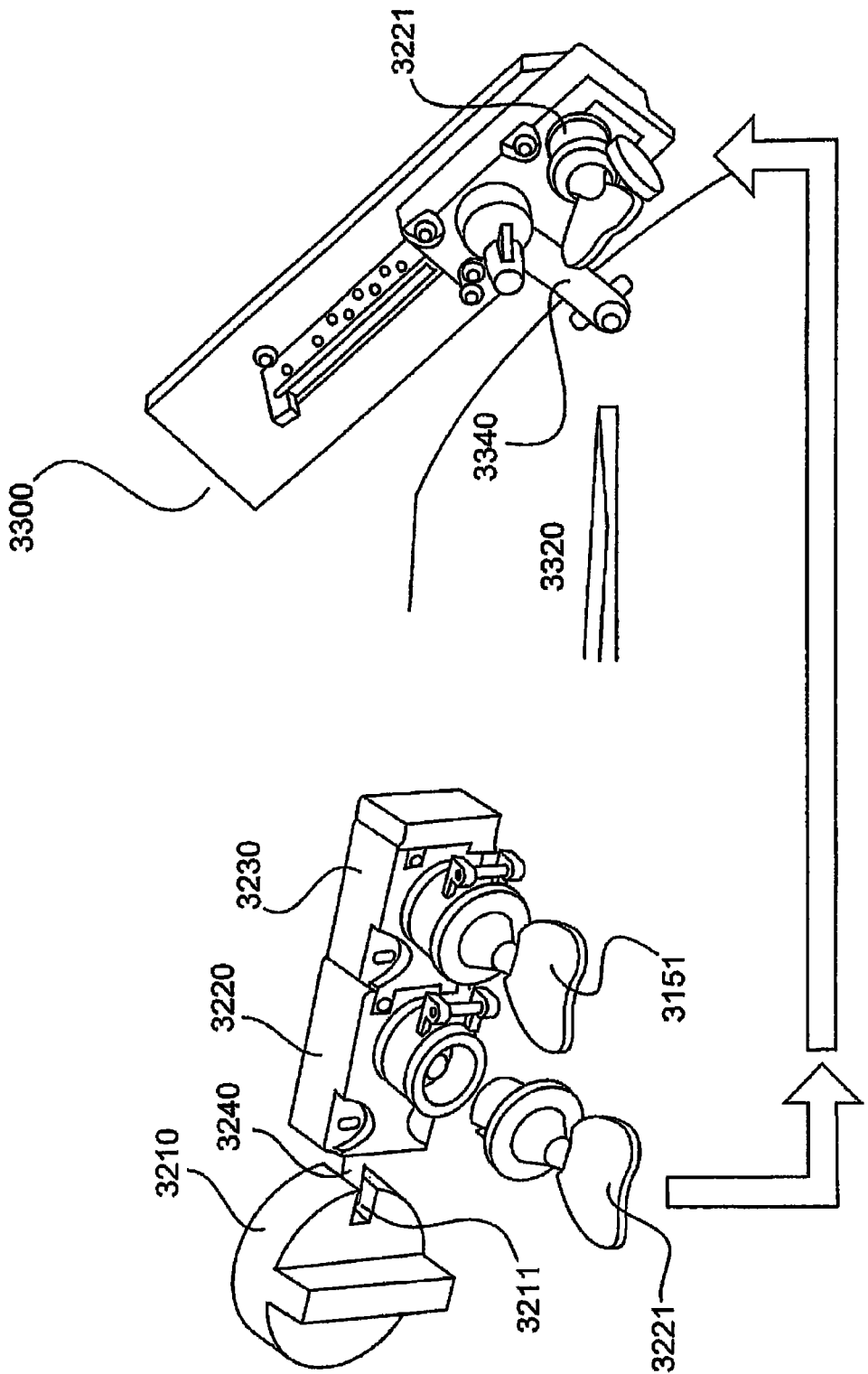

WIND TURBINE AND METHOD FOR CONTROLLING AN ACCESS POINT IN A CLOSED AREA OF A WIND TURBINE

BACKGROUND

Technical Field

The present invention relates to a wind turbine and a method for controlling access in a closed-off region of a wind turbine.

Description of the Related Art

The rotor hub of a wind turbine is typically connected to the generator rotor or to a transmission, such that, by rotating the rotor, the generator rotor is also set in rotation and electrical energy is thus generated. In particular when passing between the stationary region of the nacelle and the region of the rotating rotor, serious accidents may occur if the rotor is not blocked.

DE 10 2010 043 436 A1 describes a device for controlling the locking of an opening of a door provided between a stationary part and a rotating part of the wind turbine. The device has means for fixing the rotating part. The door between the rotating and stationary parts of the wind turbine has a lock, an unlocking of the door being enabled when the means for fixing the rotating part have fixed the rotating part.

In the German patent application forming the basis of the priority, the German Patent and Trade Mark Office researched the following documents: DE 10 2006 006 949 A1, DE 10 2010 043 436 A1 and EP 2 740 928 A1.

BRIEF SUMMARY

Provided is a wind turbine having an access control system in order to prevent access by individuals to dangerous regions of the wind turbine if the rotor or parts of the rotor can rotate.

A wind turbine having a nacelle with a stationary region and a rotor, at least one blocking unit for blocking the rotor, and an access control system is thus provided. The access control system controls a locking of at least one access door to at least one closed-off region in the wind turbine depending on a blocking of the rotor by means of the at least one blocking unit. The access control system has a key transfer system and a hydraulic control unit for controlling the blocking unit. The key transfer system has a hydraulic key unit for preventing an unauthorized activation of the hydraulic unit and an access door key unit for locking or unlocking the access door. The key transfer system has at least one first and second key, the hydraulic control unit being locked or unlocked by means of the first key, and the access door key unit being locked or unlocked by means of the second key. The key transfer system also has a fan key unit for activating or deactivating the fan. The first key of the hydraulic key unit is also used to lock or unlock the fan key unit, and a fan key is used as second key to lock or unlock the access door key unit.

In accordance with a further aspect a control unit for controlling the at least one blocking unit is provided.

In accordance with a further embodiment of the invention the blocking unit and/or the at least one access door is/are hydraulically actuatable.

The access doors are then only unlocked when the rotor or parts thereof is/are blocked.

The fan, in accordance with one aspect of the invention, may be a fan of a nacelle converter cabinet.

Provided is a wind turbine having an access control system, access to certain regions, for example in the region of the nacelle of the wind turbine, being released only when the rotor or rotatable parts of the rotor is/are blocked.

Further embodiments of the invention are disclosed in the dependent claims.

BRIEF DESCRIPTION OF THE SEVERAL VIEWS OF THE DRAWINGS

Advantages and exemplary embodiments of the invention will be explained in greater detail hereinafter with reference to the drawings.

FIG. 10 shows a schematic representation of a detail of a key transfer system.

DETAILED DESCRIPTION

Figure 1:
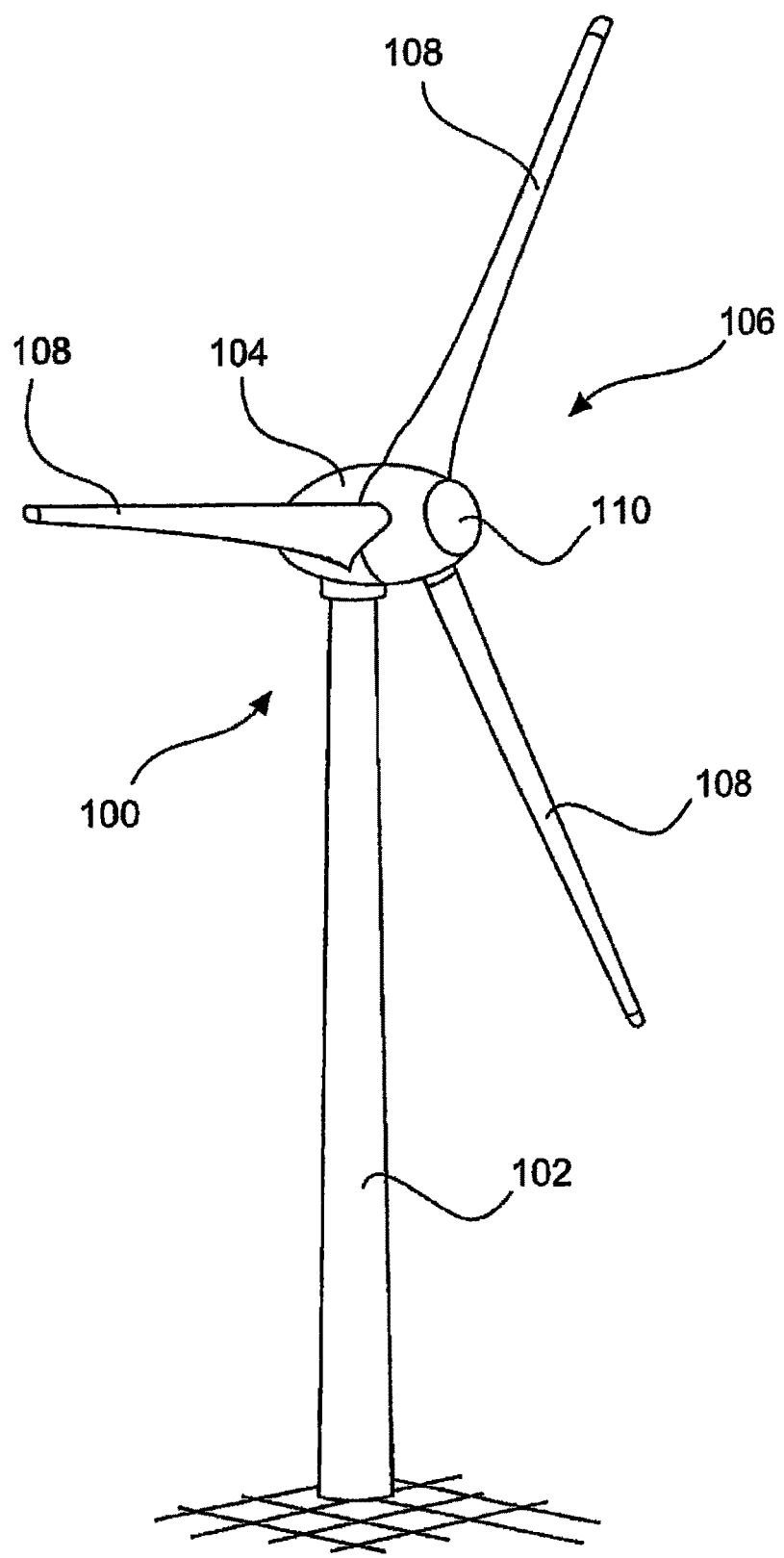
FIG. 1 shows a schematic representation of a wind turbine.

FIG. 1 shows a schematic representation of a wind turbine. The wind turbine 100 has a tower 102 and a nacelle 104. A rotor 106 having a rotor hub, three rotor blades 108 and a spinner 110 is arranged on the nacelle 104. The rotor 106 is set in rotation during operation by the wind and thus drives an electric generator 100 in the nacelle 104.

Figure 2:
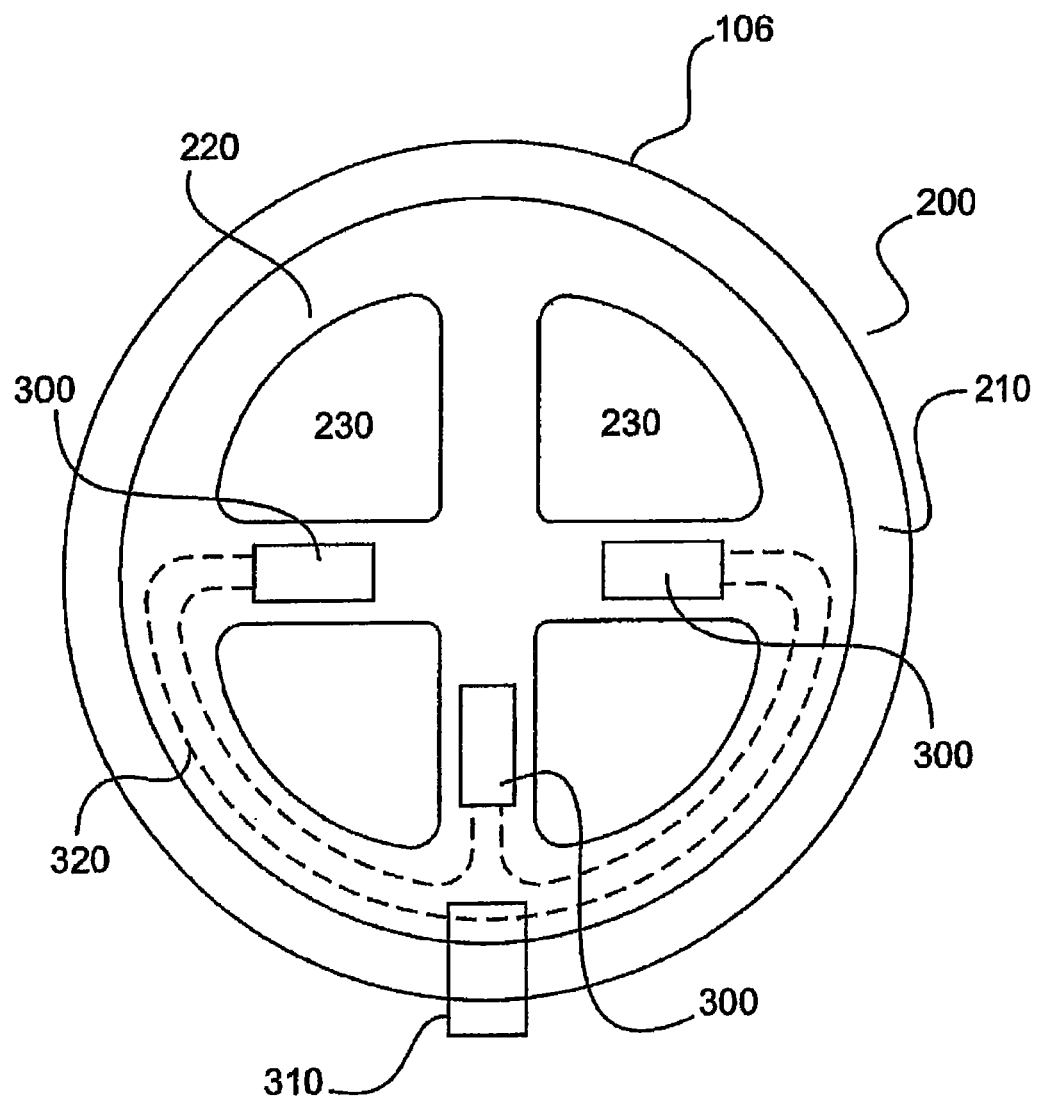
FIG. 2 shows a schematic sectional view of a generator of a wind turbine in accordance with a first exemplary embodiment.

FIG. 2 shows a schematic sectional view of a generator of a wind turbine in accordance with a first exemplary embodiment. The wind turbine in accordance with the first exemplary embodiment is based on a wind turbine according to FIG. 1. A generator 200 is provided within the nacelle or within the rotor 106 or at the transition between the stationary part of the nacelle and the rotor 106. The generator 200 has a generator stator 210 and a generator rotor 220. At least one blocking unit 300 is provided on the generator rotor 220 and is designed to block the generator rotor 220, such that the generator rotor 220 cannot continue to rotate. In the region of the generator rotor 220, at least one manhole 230 or an opening 230 may be provided. Service staff can enter the front region of the wind turbine, specifically the spinner 110, through this manhole or the opening 230. This spinner 110 is part of the rotor 106 and thus rotates when the rotor blades 108 rotate.

In order to control the blocking units 300, a (hydraulic) control unit 310 is provided. This control unit 310 may be located both in the rotor 106 of the wind turbine and in the stationary part of the nacelle 104.

The blocking units 300 by way of example may be operated hydraulically, such that for example bolts can be moved into corresponding openings in the rotor, for example of the generator, upon actuation of the hydraulics. The control unit 310 by way of example may be formed as a hydraulic control unit 320 and may actuate or activate the blocking units 300 via the hydraulic lines 320.

Figure 3:
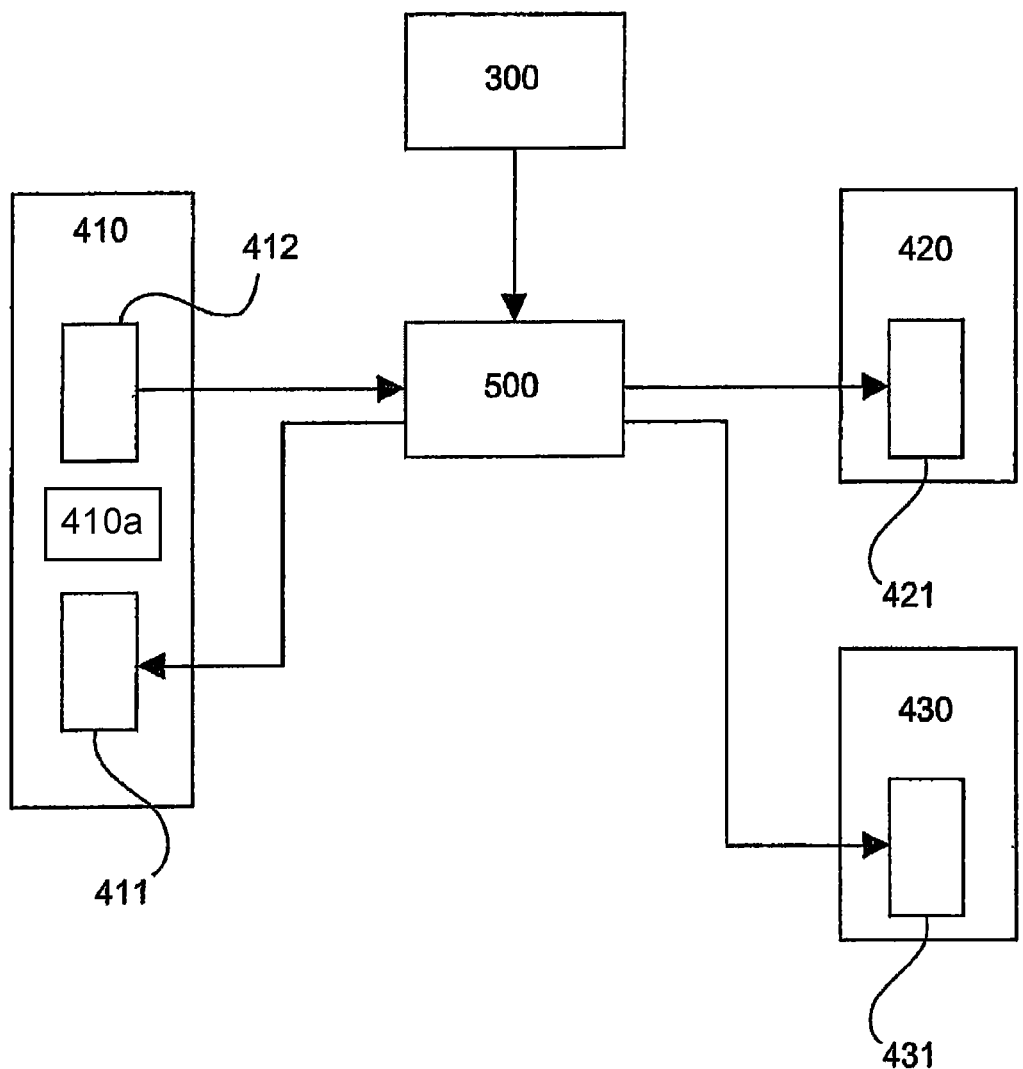
FIG. 3 shows a schematic representation of an access control system in accordance with a second exemplary embodiment, FIGS. 4A-4C each show a hydraulic diagram of the access control system in accordance with a third exemplary embodiment.

FIG. 3 shows a schematic representation of an access control system in accordance with a second exemplary embodiment. A plurality of regions 410, 420, 430 may be provided in the region of the nacelle 104 of the wind turbine 100, in which regions access control is desired, for example in order to increase the operating safety. The access to these regions 410, 420, 430 is to be released only when this appears to be quite safe based on legal occupational safety considerations. For this purpose, for example the rotor 106 of the wind turbine or rotatable parts in the region of the nacelle 104 should be blocked or fixed.

Alternatively or additionally, by way of example, a master switch for ventilators or fans 410a in a nacelle converter cabinet 410 may be deactivated before access to the nacelle converter cabinet 410 is enabled. The second region 420 by way of example may be the region of the spinner 110, which may be secured by an access door 421. The third region 430 by way of example may optionally be a region within the generator. This region 430 may also be secured by an access door 431. An access control system 500 is provided, which may be coupled both to the blocking units 300 and to the access doors 411, 421, 431. Here, the access control system 500 may release the access for example to the doors 421, 431 and 411 only when the rotor is blocked by means of the blocking units 300. Optionally or additionally, it may be checked whether for example a master switch for ventilators or fans in the nacelle converter cabinet 410 is deactivated.

Figure 4A:
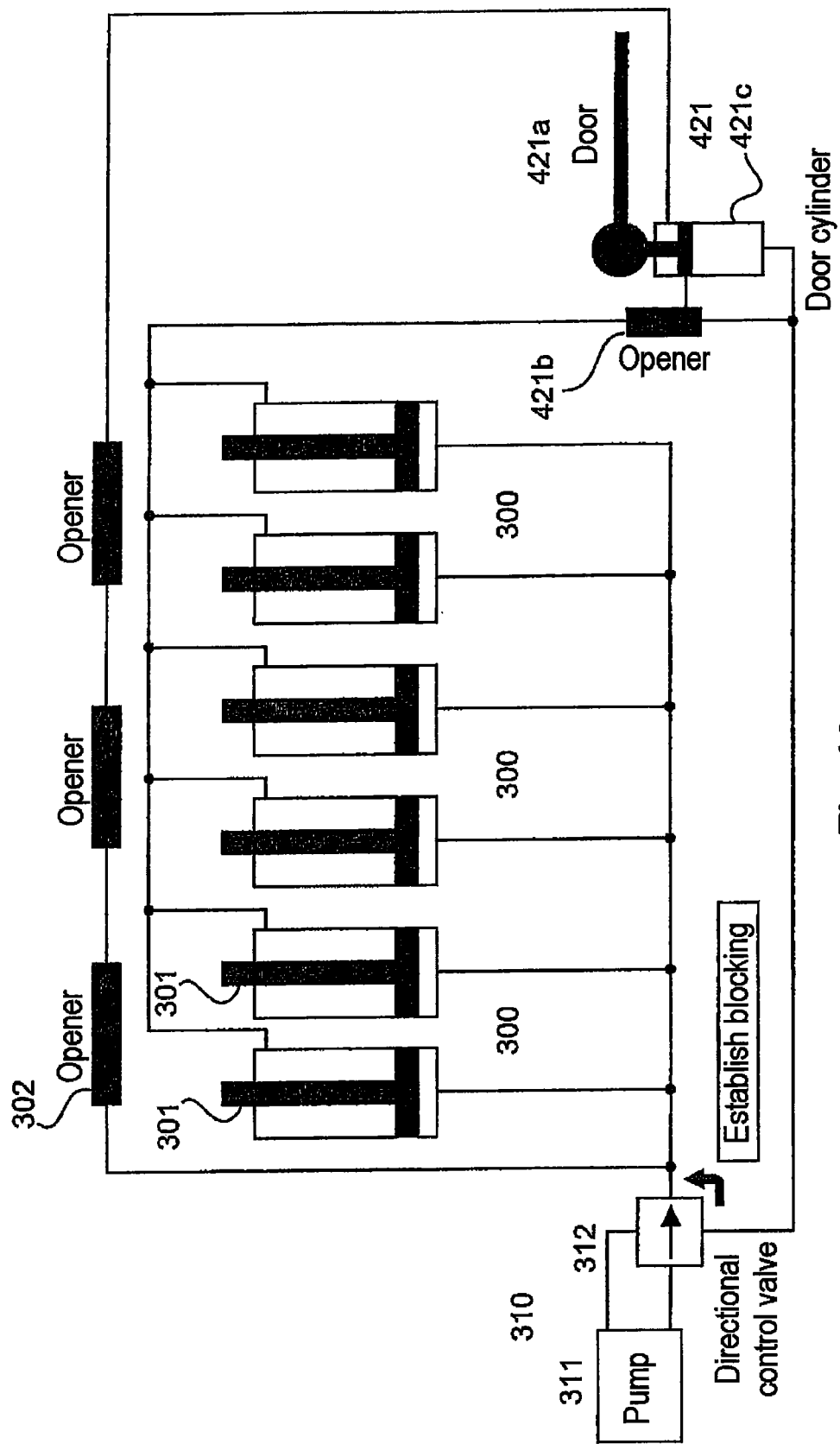
Figure 4B:
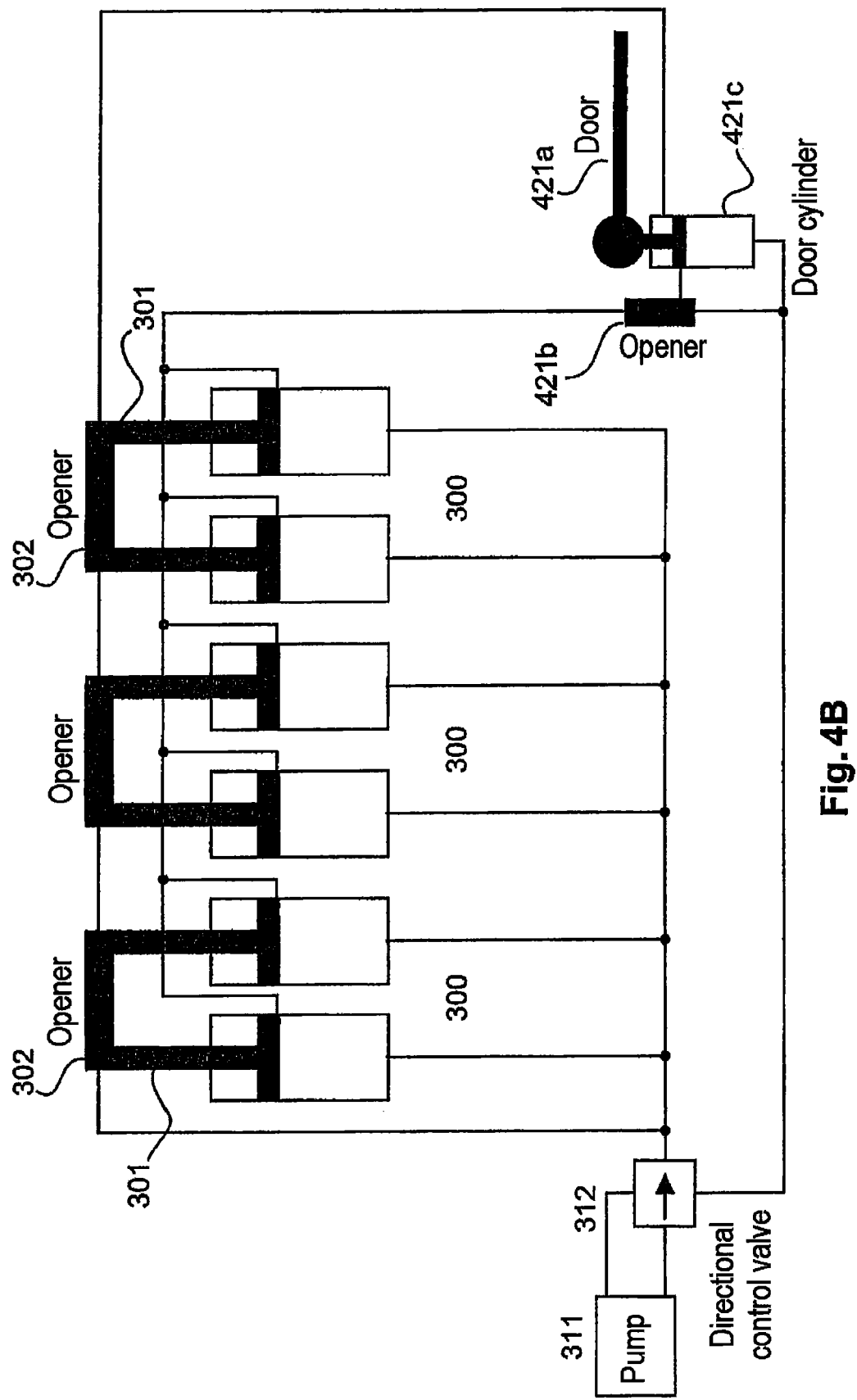
Figure 4C:
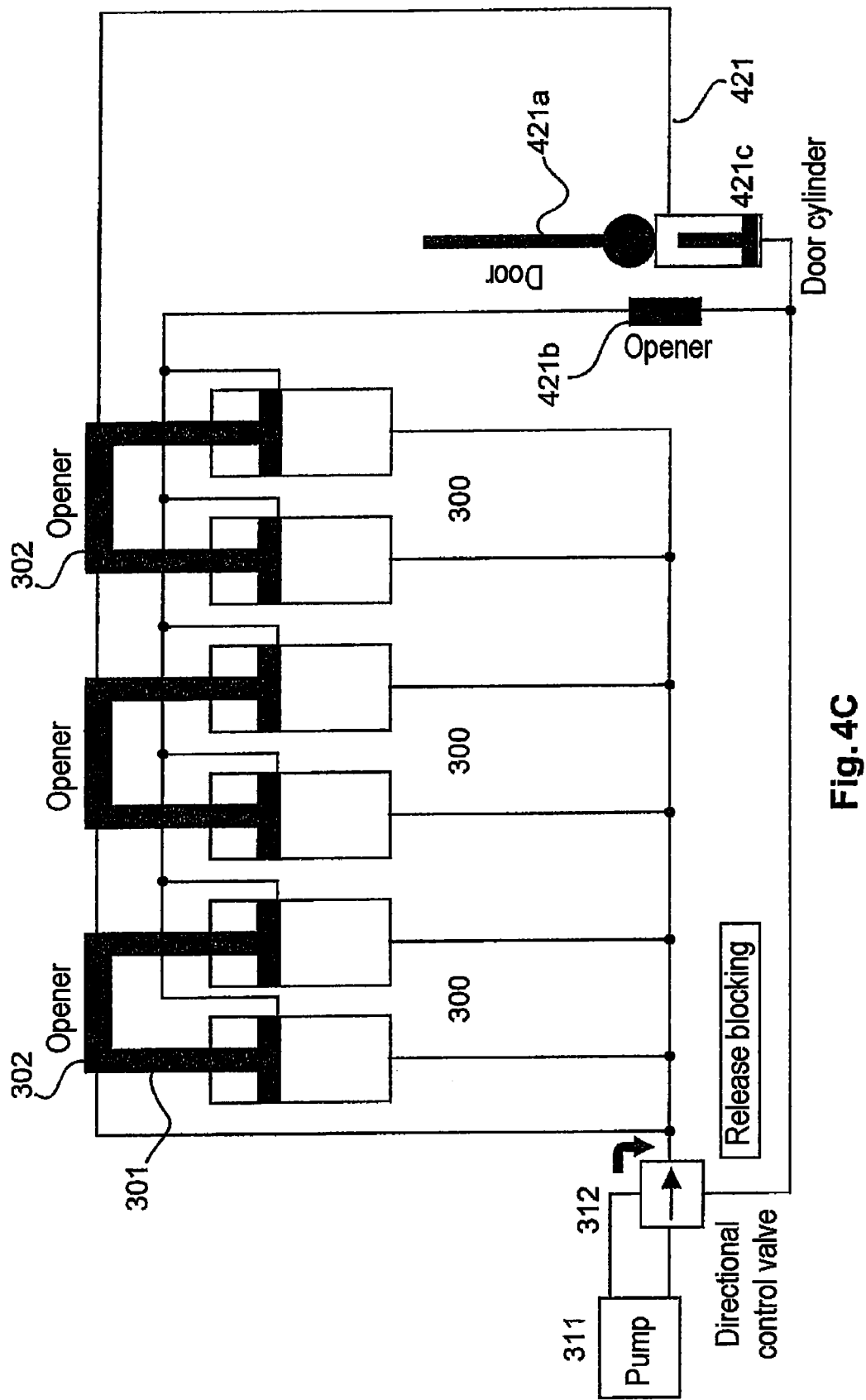

FIGS. 4A-4C each show a hydraulic diagram of the wind turbine in accordance with a third exemplary embodiment. For example, three blocking units 300 (at the generator rotor) in the hydraulic diagram are each provided for example with two blocking bolts 301. Further, a hydraulic control unit 310 having a hydraulic pump 311 and a hydraulic directional control valve 312 is shown. Furthermore, at least one door-closing unit 421 having a hydraulically closable door 421a, a hydraulically actuatable opener 421b, and a hydraulic door cylinder 421c is shown.

When the directional control valve 312 is in a first operating mode, the blocking of the blocking units 300 is then activated such that the bolts 301 are extended and are each locked with one of the openers 302. This situation is shown in FIG. 4B. The directional control valve 312 may then be adjusted in a second operating mode in such a way (see FIG. 4C) that the door 411, 421, 431 can be unlocked when the blocking units 300 are activated, such that service staff can enter the regions 410, 420, 430.

Figure 5:
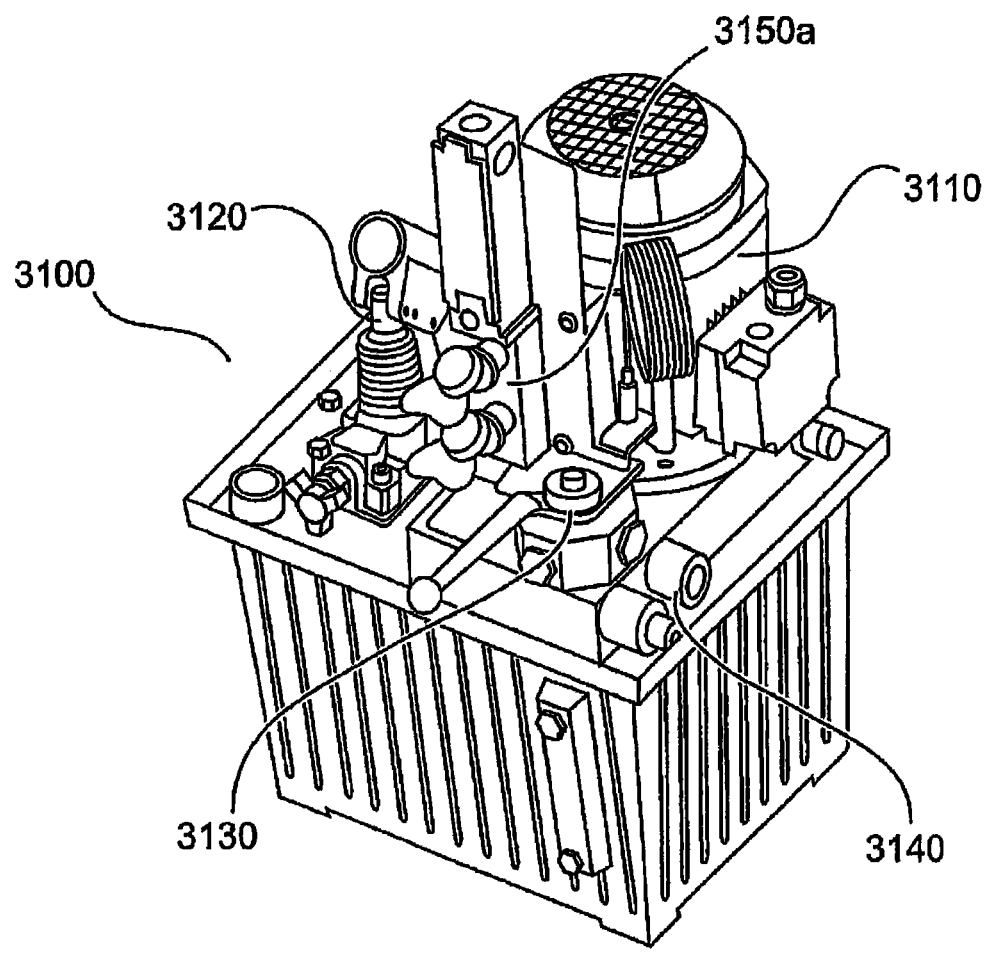
FIG. 5 shows a schematic representation of a hydraulic control unit of an access control system in accordance with a fourth exemplary embodiment, FIG. 6A-6D each show a schematic representation of a functioning of an access control system in accordance with the fourth exemplary embodiment, FIGS. 7A and 7B each show a detailed view of the hydraulic control unit of FIG. 5.

FIG. 5 shows a schematic view of a hydraulic control unit of an access control system in accordance with a fourth exemplary embodiment. The hydraulic control unit 3100 is part of an access control system 500 for a wind turbine. Here, the access control system 500 in accordance with the fourth exemplary embodiment may be based on an access control system in accordance with the first, second or third exemplary embodiment. By means of the access control system 500, access to the rotating parts of the wind turbine, for example the spinner of the wind turbine, is to be prevented in particular. The hydraulic control unit 3100 has an electric hydraulic pump 3110, a hand pump 3120, a hydraulic changeover valve 3130, quick couplings 3140 for hydraulic hoses, and a hydraulic key unit 3150a. With the changeover valve 3130, the flow of the hydraulic fluid can be activated or deactivated. By means of the hydraulic key unit 3150a it is to be ensured that the changeover valve 3130 is released only under certain conditions. The hydraulic key unit 3150a is part of the access control system.

FIGS. 6A-6D each show a schematic representation of a functioning of an access control system in accordance with the fourth exemplary embodiment. By means of the blocking unit 300, which has extendable bolts 301, the generator rotor 220 is to be blocked. For this purpose, the bolts 301 can be moved into corresponding recesses 221 in the generator rotor 220. A pulsor or another optical, electric or magnetic sensor 300a is provided in the region of the blocking unit 300 and monitors whether or not the bolts 301 are extended. This is shown in FIGS. 6A-6D in each case on the right at the top.

In the middle of FIGS. 6A-6D the blocking units 300 with the extendable bolts 301 are shown schematically in each case. The blocking units 300 are coupled via hydraulic lines to a directional control valve 3130 and the hand pump 3120 and/or the electric pump 3110.

In each of FIGS. 6A-6D a detail of the hydraulic control unit 3100 at different moments in time during the blocking of the rotor is shown on the right-hand side. Furthermore, a fan key unit 3200 as second part of the key transfer unit 3150 is shown in FIGS. 6A-6D, in each case to the right at the bottom.

Figure 6A:
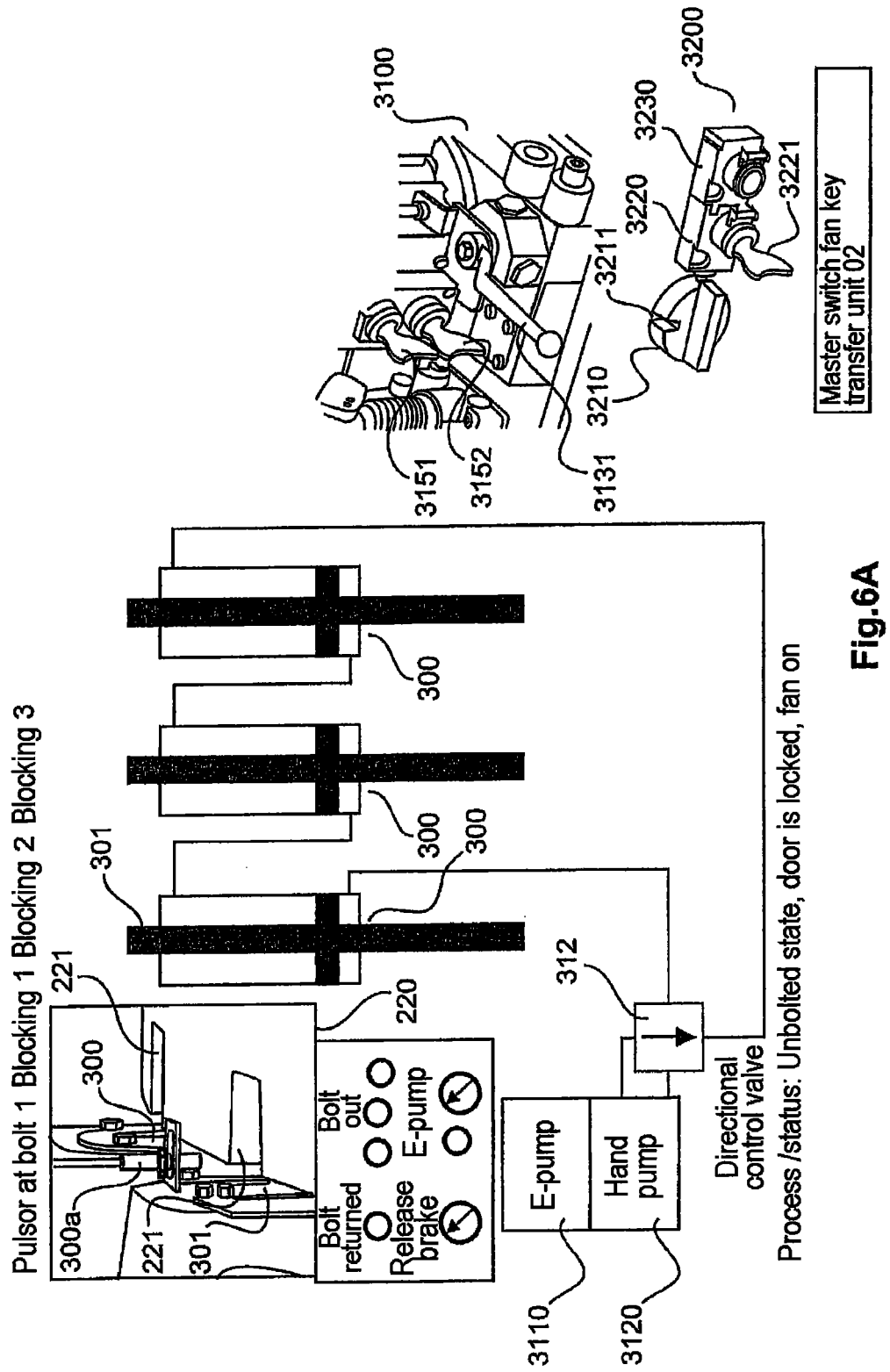

In FIG. 6A the situation in which the two keys 3151, 3152 of the first hydraulic key transfer unit 3150 have been rotated through 90° and the bolts 301 are not extended is shown. The rotation of the keys 3151, 3152 and therefore a removal of the keys 3151, 3152 can be realized only when the lever 3131 of the changeover valve 3130 has been brought into the correct position. At this moment the blocking of the rotor can be activated by actuating the hand pump 3120.

Figure 6B:
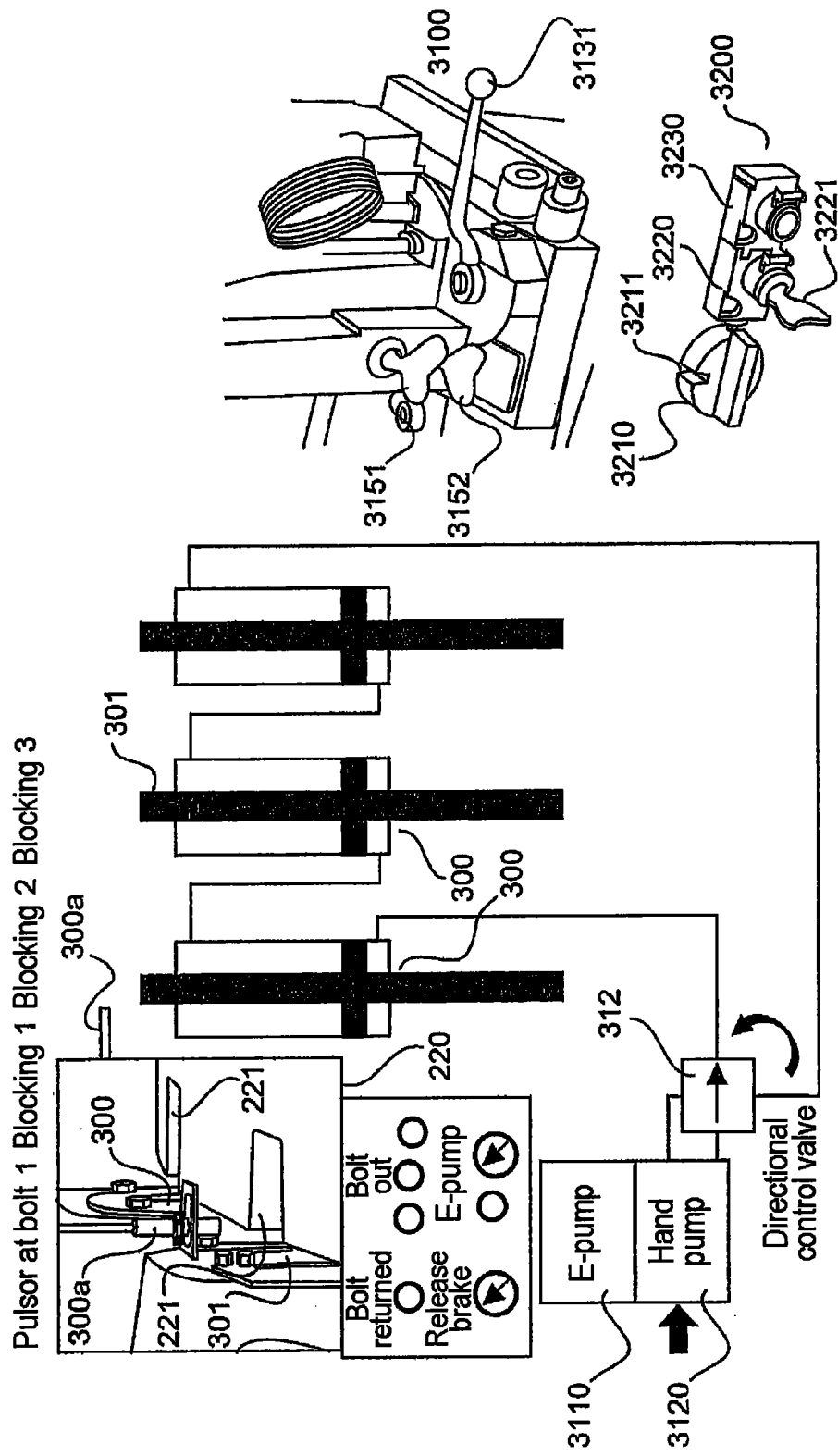

In FIG. 6B the moment at which the bolts 301 are not extended is shown. At this moment, for example, an access door is locked and/or the fan is switched on. The wind turbine can thus start operating normally. During the normal operation of the wind turbine (i.e., the rotor is not blocked), the keys 3151 and 3152 are in a starting position. The keys cannot be removed. The changeover valve 3130 is optionally freely pivotable In FIG. 6C the situation is shown in which the bolts 301 are partially extended. This is detected by the optical sensor 300a, and the electric pump 3110 is released, such that the bolts 301 can be further extended.

Figure 6C:
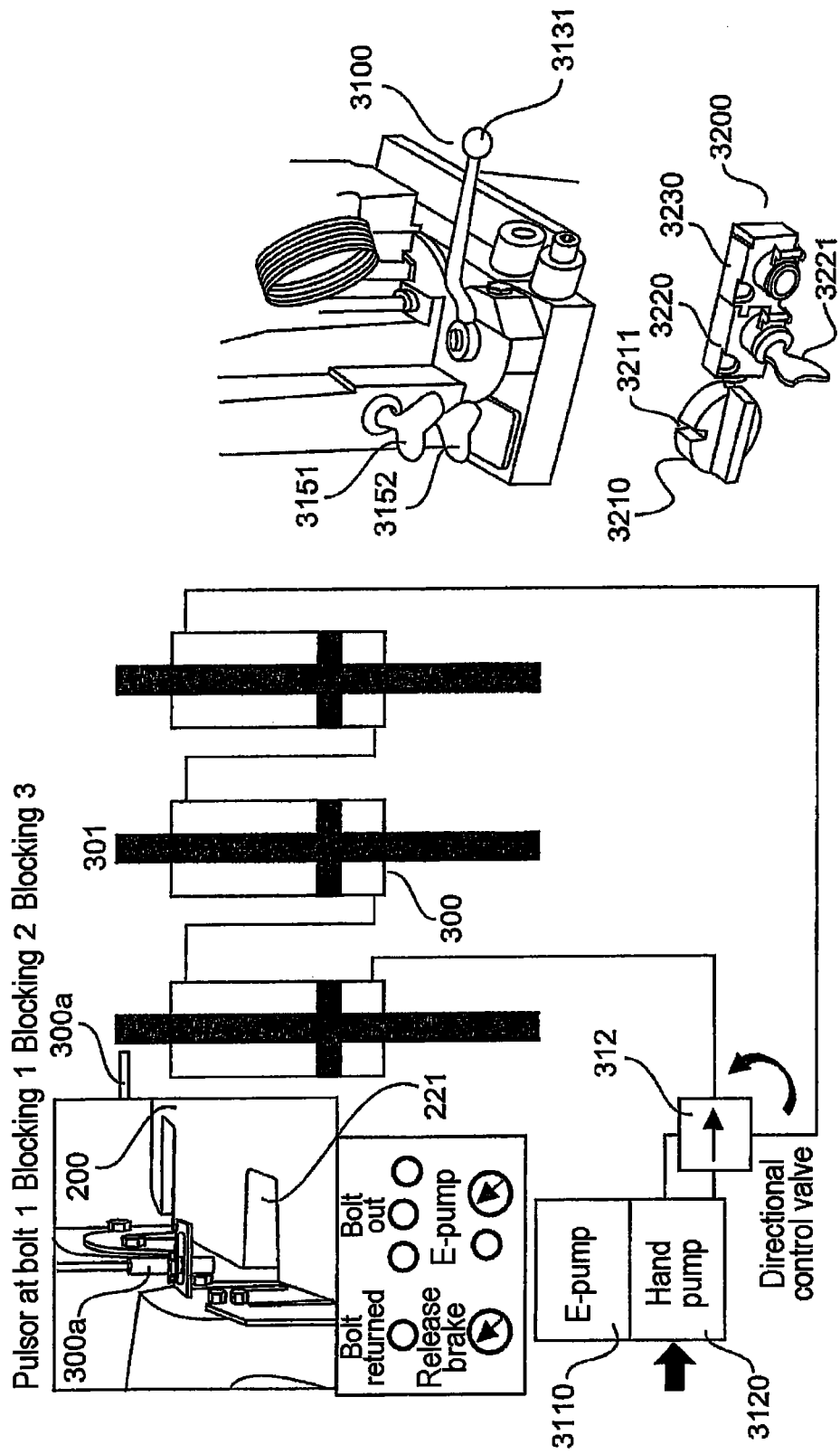
Figure 6D:
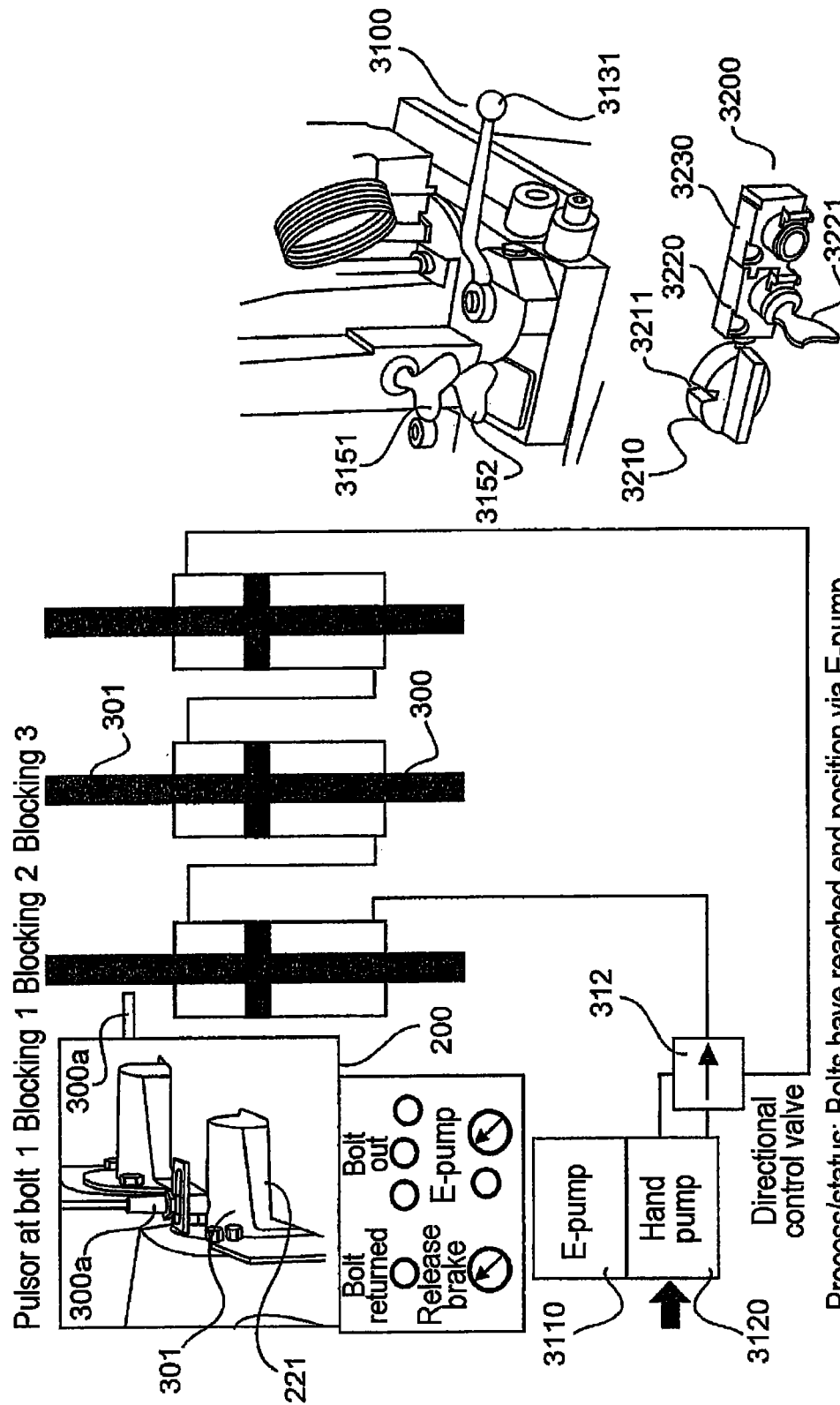

In FIG. 6D the situation is shown in which the bolts 301 are completely extended and are therefore located within the recesses 221. The blocking process is thus complete, and the rotor 106 of the wind turbine can no longer rotate.

In FIGS. 6A-6D a fan key unit 3200 as second part of the key transfer unit 3150 is shown, in each case on the right at the bottom. The fan key unit 3200 will be described in greater detail in FIG. 8 and FIGS. 9A and 9B. In these states shown in FIGS. 6A-6D, the fan switch 3210 is set to "on" and the fan key unit 3200 is blocked.

In the state shown in FIG. 6A the lever 3131 of the changeover valve 3130 is shown in a first position, in which the hydraulic key unit and the two keys 3151, 3152 are blocked and therefore cannot be removed. In FIG. 6B the lever 3131 is in a second position. The same is true for the situation FIGS. 6C and 6D.

In the situations shown in FIGS. 6A-6D, the two keys 3151, 3152 in the hydraulic key unit 3150 are blocked and cannot be removed. In FIGS. 6B-6D, the lever 3131 of the changeover valve 3130 is in a bolted position. A recess is thus arranged beneath the bolt.

Figure 7A:
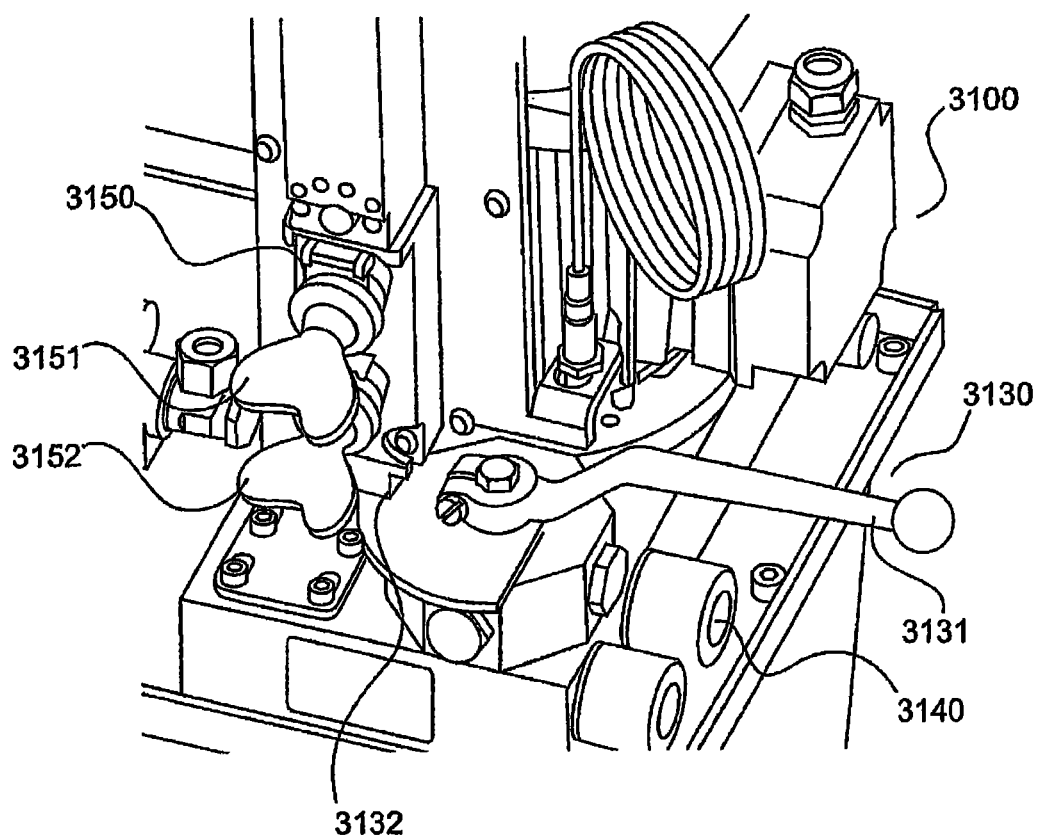
Figure 7B:
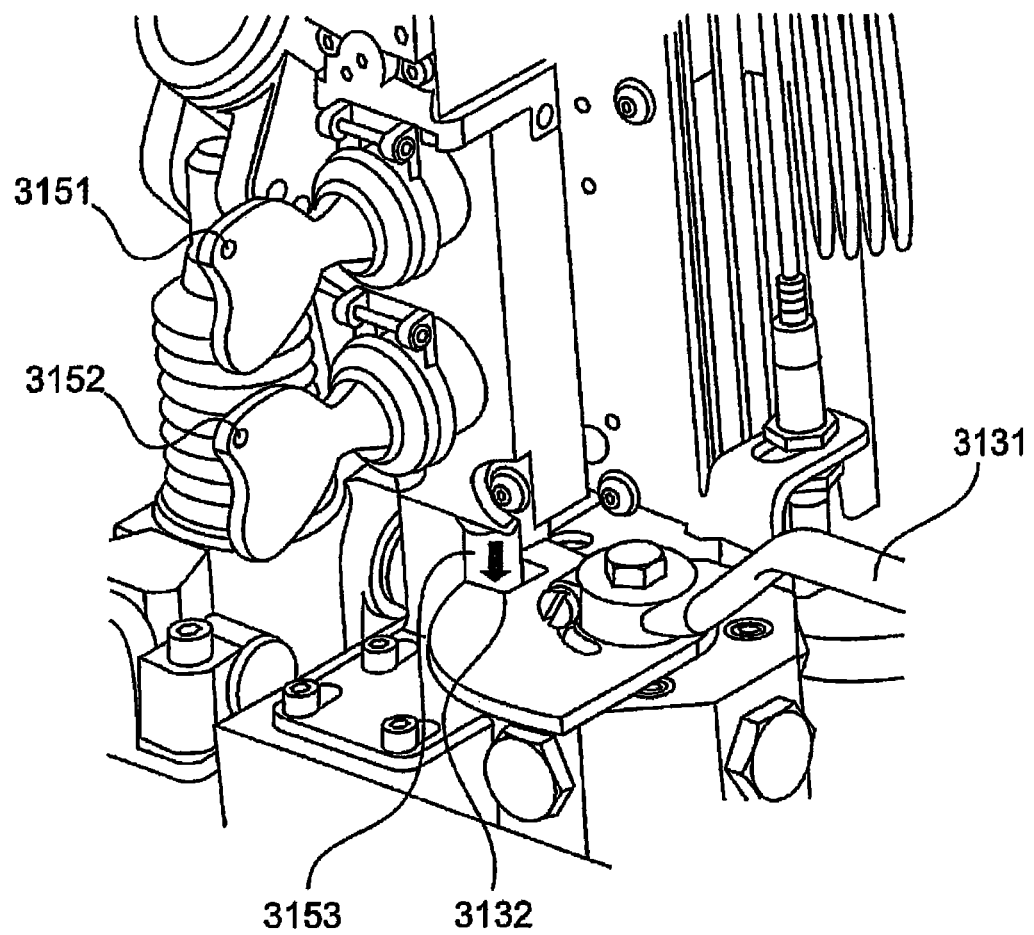

FIGS. 7A and 7B each show a detailed view of the hydraulic control unit of FIG. 5.

In FIG. 7A the moment according to FIG. 6B is shown. The two keys 3151, 3152 have each been actuated in order to release a bolt 3153.

In FIG. 7B the situation is shown in which the first and second keys 3151, 3152 have been actuated, such that the bolt 3153 is extended. Here, the bolt 3153 runs into a recess 3132 of the changeover valve 3130 and thus blocks the changeover valve 3130.

In FIG. 7A the recess 3132 is shown, which is arranged beneath the extendable bolt. In the exemplary embodiment of FIGS. 7A and 7B, the two keys 3151, 3152 are rotatable. In FIG. 7B the keys are oriented in the longitudinal direction of the extending bolt and can be removed.

Figure 8:
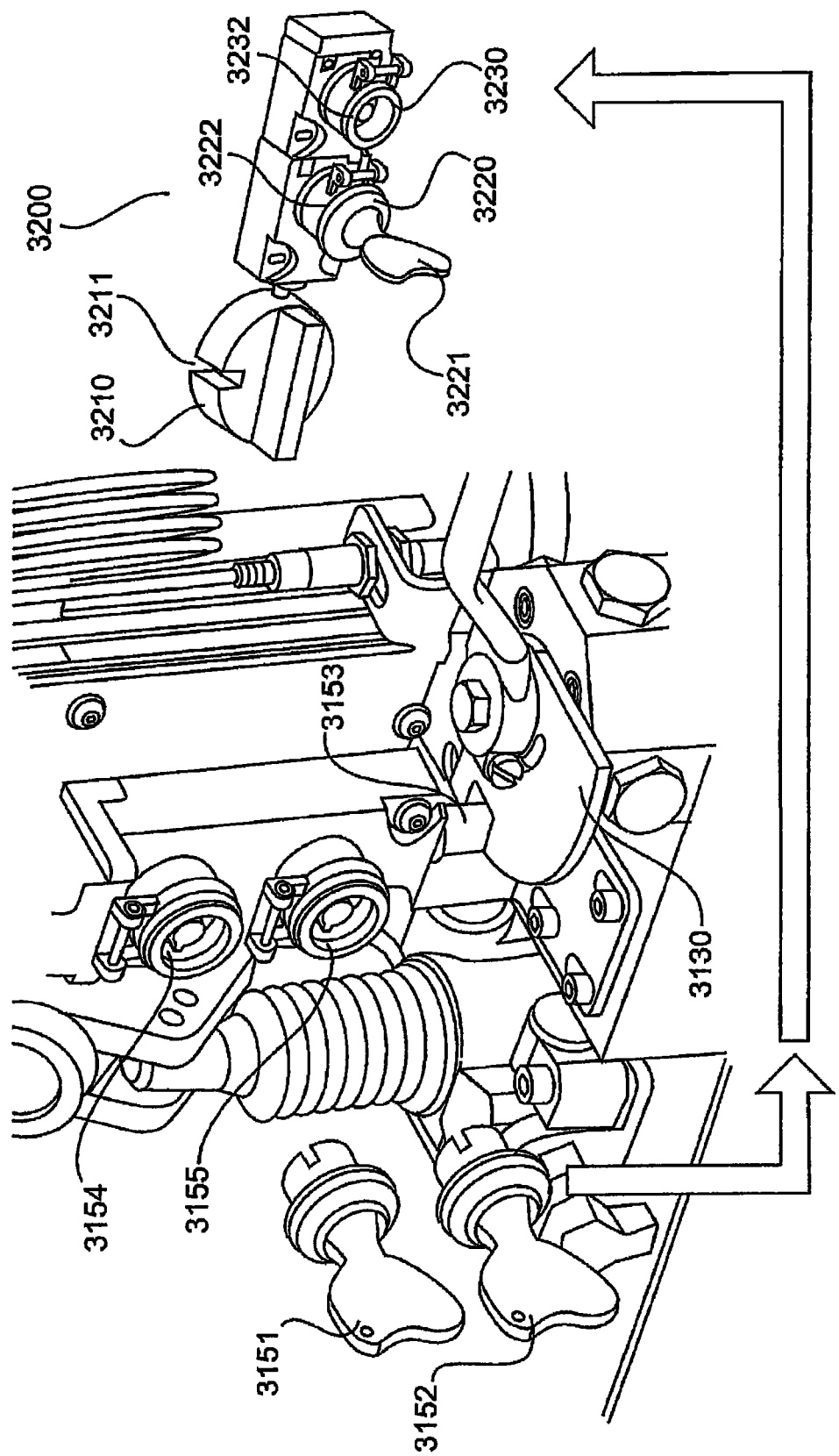
FIG. 8 shows a schematic representation in order to illustrate a key transfer system of an access control system.

FIG. 8 shows a schematic representation for illustrating a key transfer system of an access control system. Once the bolt 3153 has been extended and is thus located in the recess 3132, the changeover valve 3130 cannot be actuated. The two keys 3151 and 3152 can be removed and one of the keys can be introduced into the fan key unit 3200 in order to deactivate the fan. The fan key unit 3200 has a first and second key unit 3220, 3230. A first fan key 3221 is introduced into the first key unit 3220. The second key unit 3230 serves to receive the first key 3151.

Figure 9A:
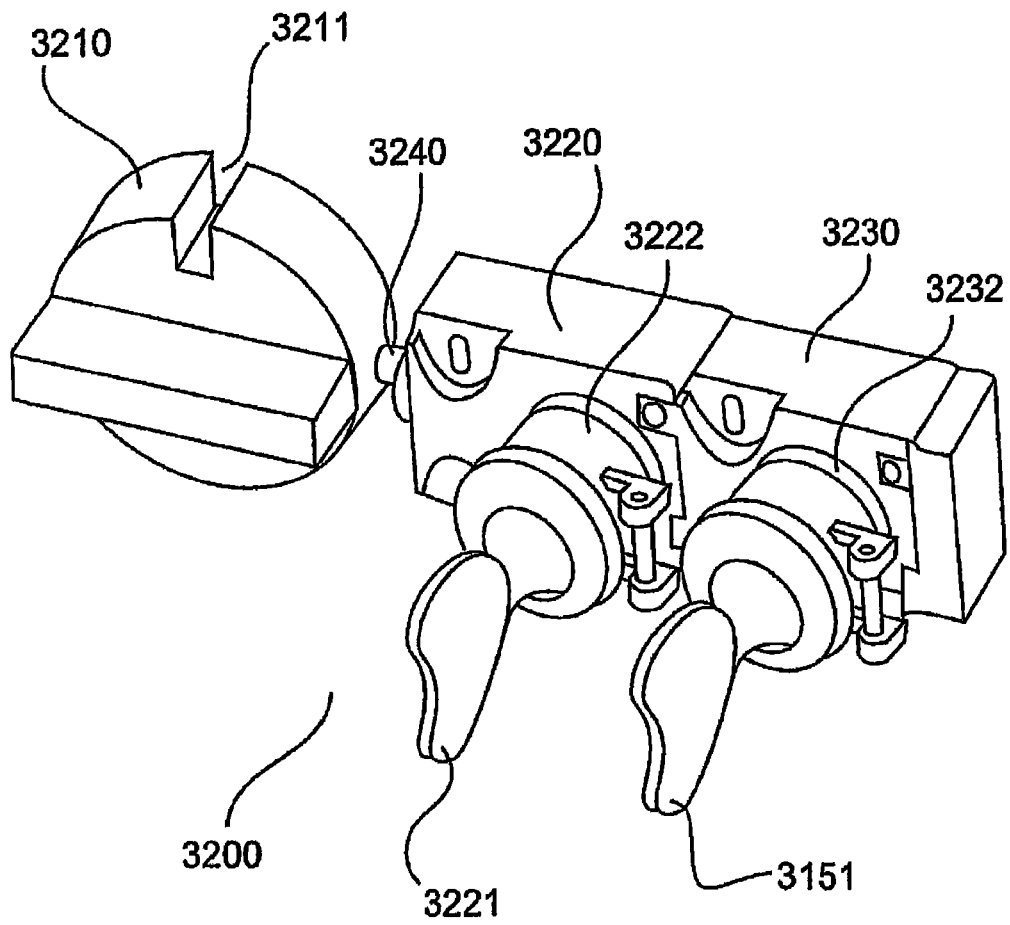
FIGS. 9A and 9B show schematic representations of a key system for a fan.
Figure 9B:
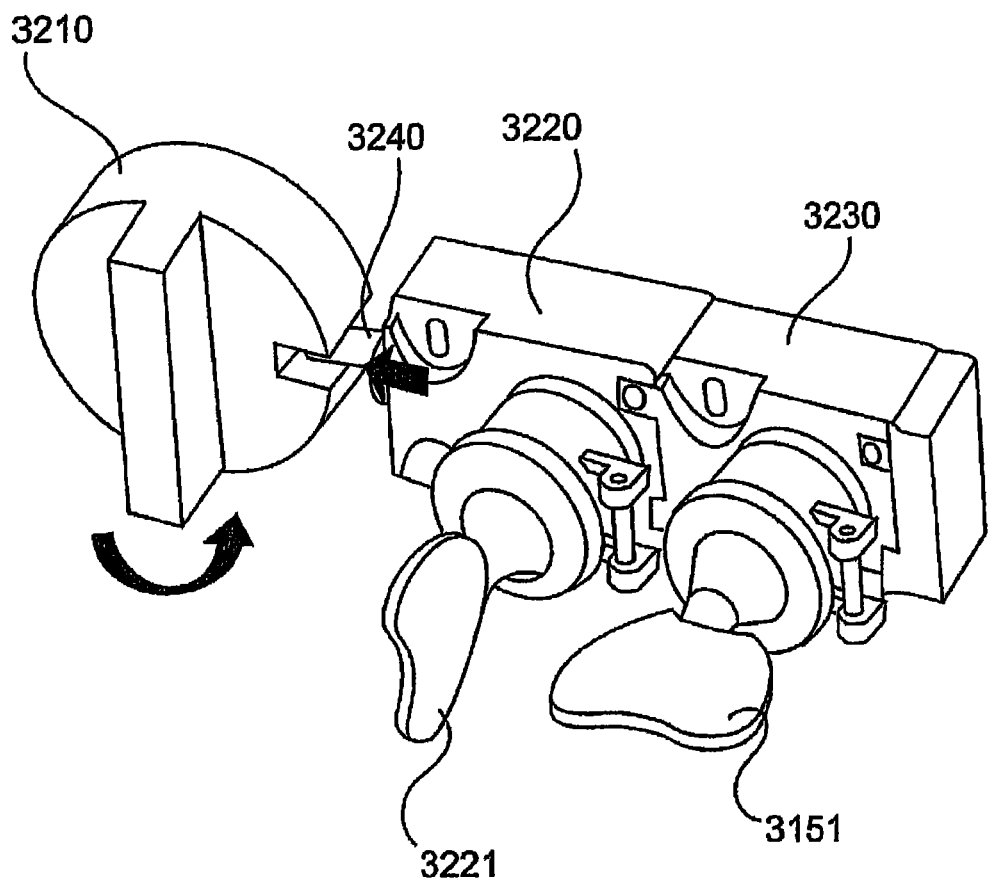

FIGS. 9A and 9B show schematic representations of a fan key unit for a fan. In FIGS. 9A and 9B two different states of the fan key unit 3200 are shown. In FIG. 9A the first state is shown, in which the fan is still activated and the first key 3151 is introduced into the second key unit 3230. In FIG. 9B the situation is shown in which the first key 3151 is placed in the second key unit 3230 and is rotated through 90°. The fan must be switched off beforehand so that the bolt 3240 of the fan key unit 3200 can be inserted into the recess 3211. For this purpose, the operating unit 3210 can be rotated through 90°. In this case a bolt 3240 can be introduced into the recess 3211 of the operating unit 3210 and can therefore lock the operating unit 3210 of the fan.

In FIG. 9A the fan is switched on, the fan key 3221 is locked, and the key 3151 is inserted. In FIG. 9B the key 3151 is rotated and thus locked. At the same time, the fan key 3221 is unlocked and can be removed. At the same time, the bolt 3240 runs into the recess 3211 and locks the operating element of the fan. The fan is thus switched off.

FIG. 10 shows a schematic illustration of a detail of a key transfer system. In FIG. 10 the situation is shown in which the fan is switched off and the bolt 3240 is introduced into the recess 3211. The first key 3151 is in a locked state and the fan key 3221 can then be removed and can be placed in an access door key unit 3300 as third part of the key transfer unit 3150 in order to unlock the access door 3320. Only once the key 3221 has been introduced into the access door key unit 3300 and actuated can the door 3320 be unlocked.

Figure 11:
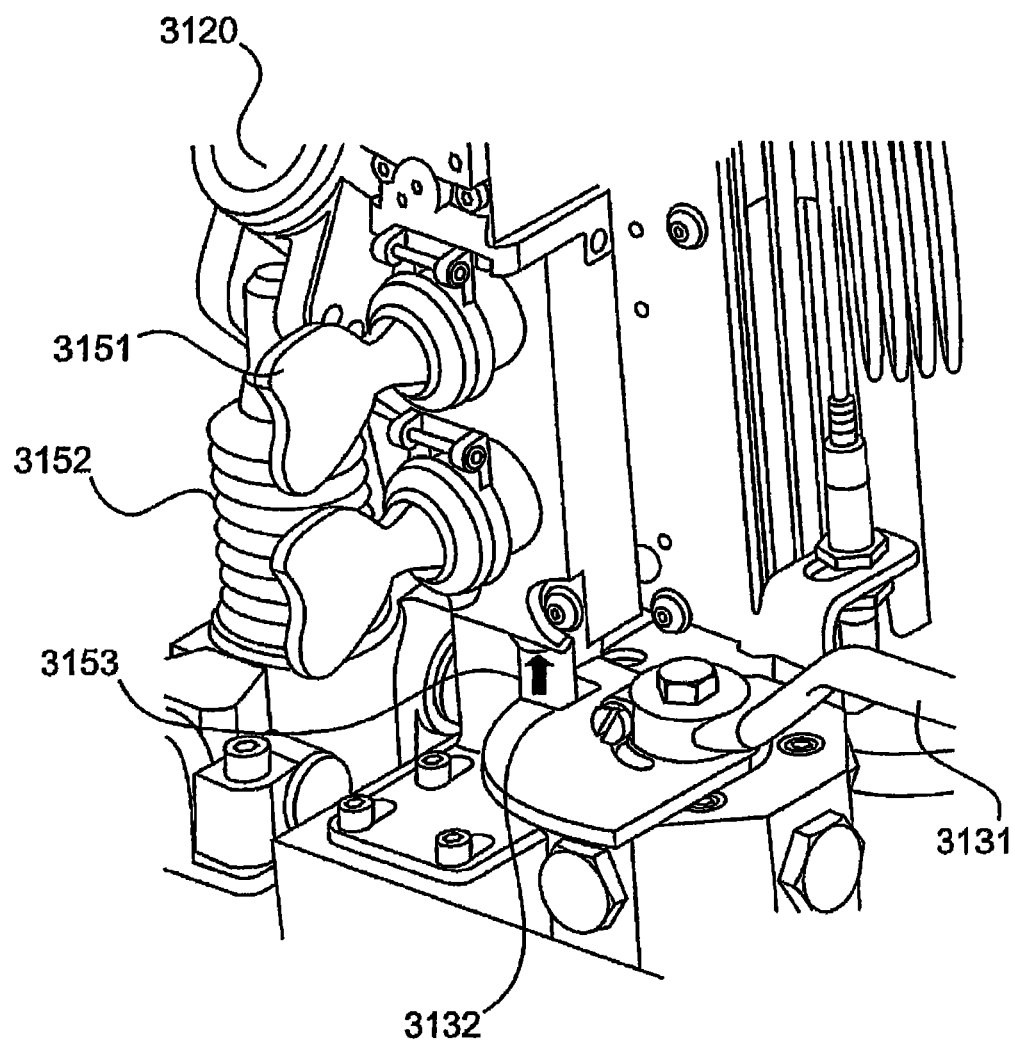
FIG. 11 shows a further detail of the hydraulic control system of FIG. 5, and FIGS. 12A-12B each show a schematic view in order to illustrate the key transfer system of an access control system.

FIG. 11 shows a further detail of the hydraulic control system of FIG. 5. In FIG. 11 the state is shown in which the rotor 106 of the wind turbine is to be unlocked. When the release for blocking has been granted, the keys 3151, 3152 can be rotated through 90 degrees when the changeover valve has been brought into the corresponding position, such that the bolt 3153 of the key unit can be inserted into the recess. The blocking may therefore be actuated only in the blocking direction.

In FIG. 11 the valve position of the changeover valve has been set to bolt, and the key 3151 is inserted. Here, the bolt 3153 may be introduced, for example when the key 3151 is rotated, and may thus release the lever 3131.

Figure 12A:
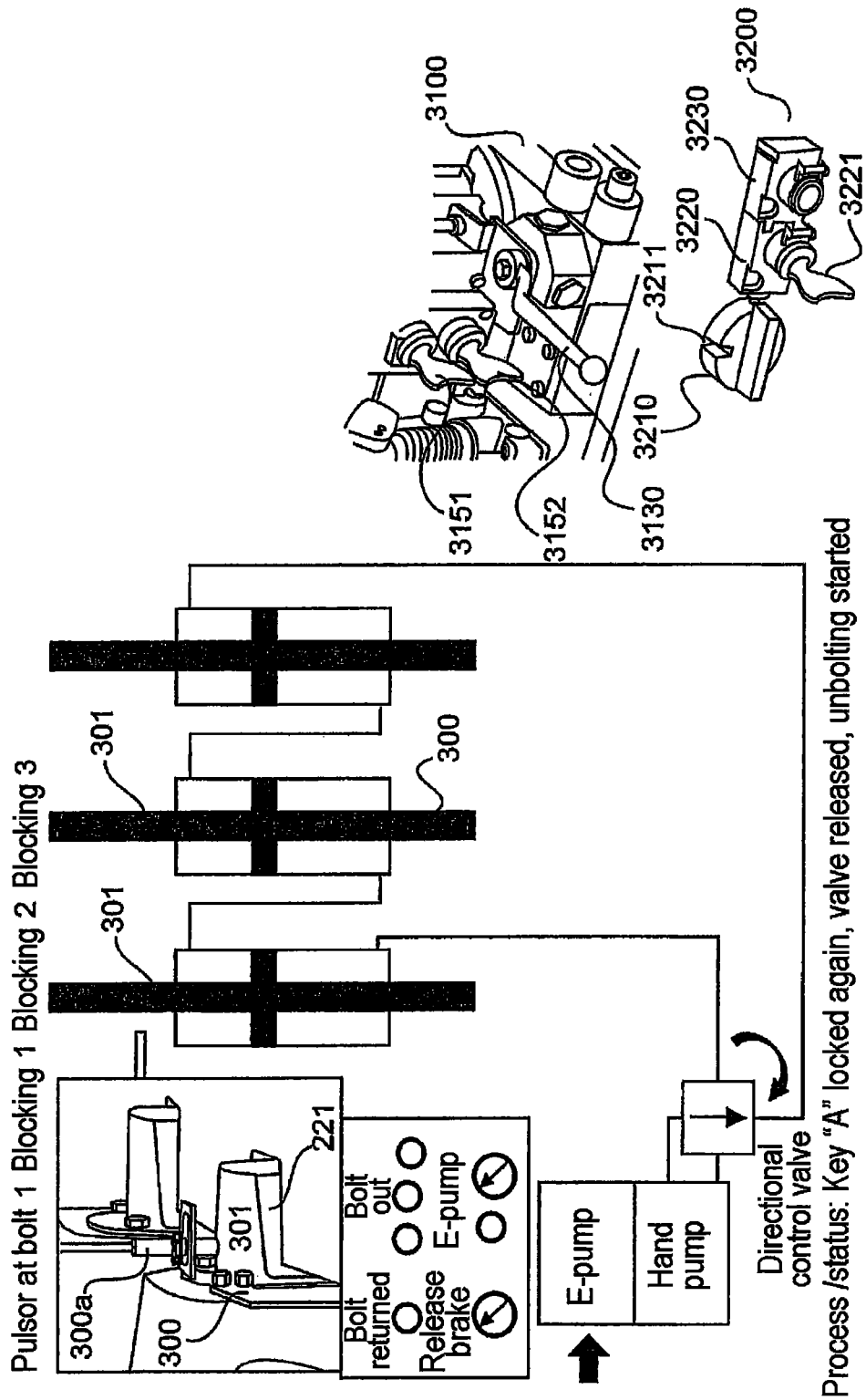
Figure 12B:
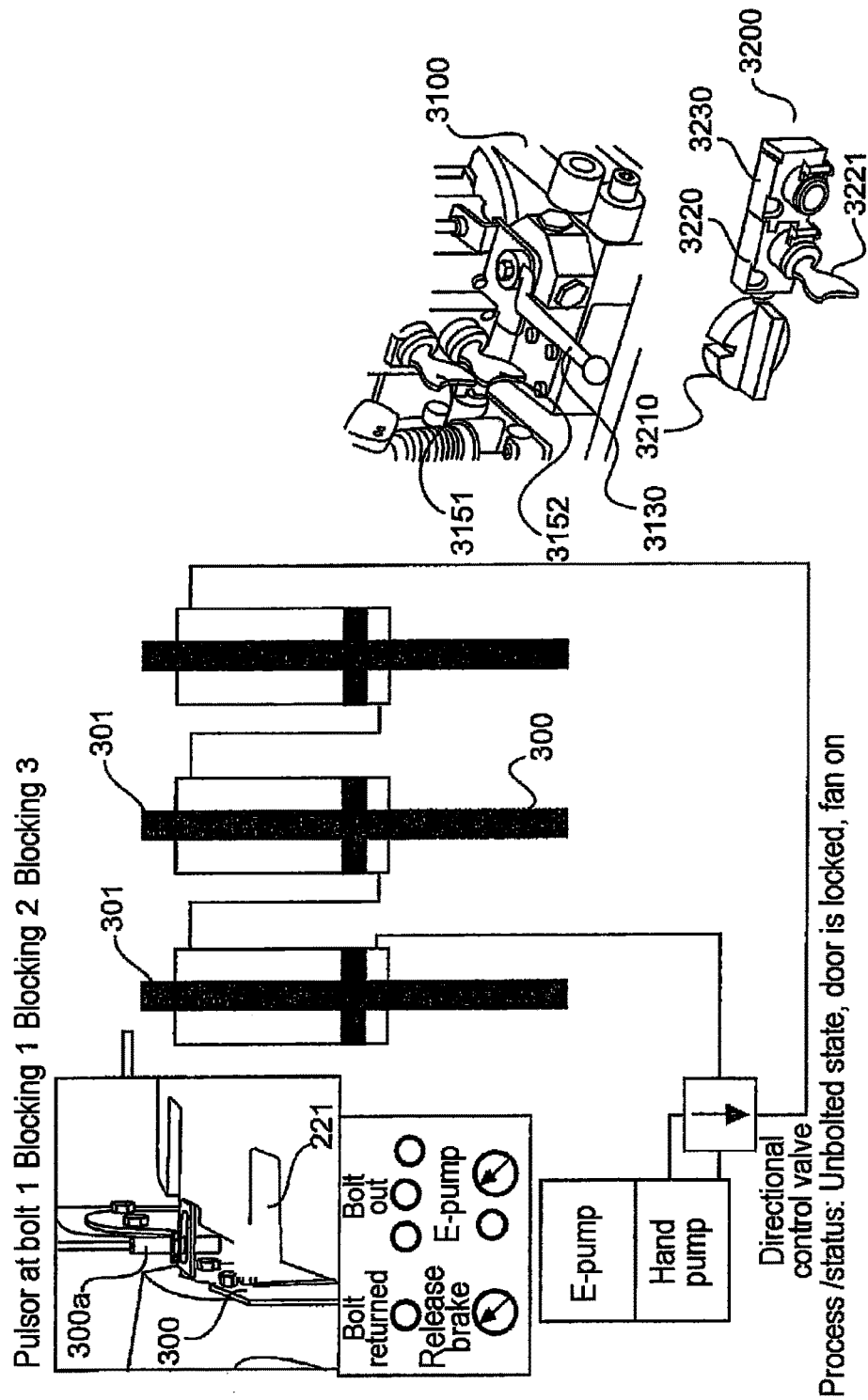

FIGS. 12A-12B each show a schematic view for illustrating the access control system. In FIG. 12A the situation is shown in which the generator rotor or the rotor 106 of the wind turbine is blocked by means of the bolts 301 of the blocking unit (see at the top on the left). In other words, the bolts 301 are extended and located in the recesses 221 of the generator rotor. The first and second keys 3151, 3152 are each located in the key transfer unit, and the changeover valve 3130 is blocked (see on the right). The key 3221 is located in the fan key unit 3200, and the fan is switched on. Further, both the electric pump 3110 and the hand pump 3120 are activated.

In FIG. 12B the situation is shown in which the bolts 301 are moved back into the blocking unit 300 and the rotor therefore is no longer blocked. In this case the electric pump 3110 is deactivated.

In order to release the rotor, the key 3221 must be removed from the access door key unit 3300. However, this can only be implemented when the access door 3320 is closed. The key 3221 must then be introduced into the fan key unit 3200 and must be introduced there into the first key unit 3220 and rotated through 90°. The key 3151 must also be rotated through 90° and can then be removed in order to be introduced into the hydraulic key unit. Only when both keys 3151, 3152 have been introduced and rotated through 90° can the bolts 3153 then be driven in again and the changeover valve 3130 returned again by means of the lever 3131.

In accordance with an alternative exemplary embodiment of the invention the fan key unit can be omitted. In this case the first key 3151 can be used for the activation of the hydraulic control unit, and a second key can be used as key 3221 for the access door key unit 3330, i.e., the key 3152 can be used to unlock the access door. In accordance with this alternative exemplary embodiment it can thus be ensured that the hydraulic unit is not switched over in order to release the locking of the rotating part of the nacelle. The key of the hydraulic key unit specifically is inserted in the access door key unit all the while the access door is open. Only when the access door is closed can the key then be removed and introduced into the hydraulic key unit in order to cancel the locking of the hydraulic unit. It is thus ensured that the access door is closed when the valve position of the hydraulic unit is changed.

The invention claimed is:
1. A wind turbine, comprising:
   at least one closed-off region with at least one access door,
   a nacelle with a stationary region and a rotor,
   at least one blocking unit that blocks the rotor, and
   an access control system that controls a locking of the at least one access door to the closed-off region depending on a blocking of the rotor by the least one blocking unit,
   the access control system having a key transfer system and a hydraulic control unit for controlling the at least one blocking unit,
   the key transfer system having a hydraulic key unit for preventing an unintentional activation of the hydraulic control unit and an access door key unit for locking or unlocking the access door, the key transfer system having a first key and a second key, the hydraulic key unit being configured to be locked or unlocked by the first key, the access door key unit being configured to be locked or unlocked by the second key, the key transfer system having a fan key unit for activating or deactivating a fan, and the first key and the second key together being configured to lock and unlock the fan key unit, wherein when the first key is in the locked position in the fan key unit, the second key is in the unlocked position and may be removed to lock and unlock the access door key unit.

2. The wind turbine according to claim 1, comprising a control unit for controlling the at least one blocking unit.

3. The wind turbine according to claim 1, wherein at least one of the at least one blocking unit and the at least one access door is hydraulically actuatable.

4. The wind turbine according to claim 1, wherein the closed-off region is a converter cabinet located in at least one of the nacelle, a spinner and a region of the generator.

5. A method comprising:

controlling access into a closed-off region of a wind turbine, the closed-off region having at least one access door, the wind turbine having a nacelle with a stationary region and a rotor and a blocking unit for blocking the rotor, wherein controlling comprises:

locking or unlocking a hydraulic control unit for controlling the blocking unit using a first key or a second key, activating or deactivating a fan by a fan key unit, wherein activating or deactivating the fan includes locking or unlocking the fan key unit using both the first key and the second key, wherein in the locked position, the blocking unit prevents the rotor from rotating, while the fan key unit is locked, removing the second key, and locking or unlocking an access door key unit using the second key to lock or unlock the at least one access door.

* * * * *